United States Patent Office 3,812,115
Patented May 21, 1974

---

3,812,115
PROCESS FOR THE PREPARATION OF 1,8-NAPHTHALDEHYDIC ACID
Henry Bader, Newton Center, and Yunn H. Chiang, Woburn, Mass., assignors to Polaroid Corporation, Cambridge, Mass.
No Drawing. Filed Feb. 28, 1973, Ser. No. 336,797
Int. Cl. C07d 7/00
U.S. Cl. 260—343.2 R          7 Claims

ABSTRACT OF THE DISCLOSURE

Naphthaldehydic acid is synthesized by alkaline cleavage at close to room temperature using a solvent system of water and certain aprotic organic solvents.

BACKGROUND OF THE INVENTION

(1) Field of the invention

This invention relates to a method of synthesizing naphthaldehydic acid.

(2) Description of the prior art

The preparation of 1,8-naphthaldehydic acid by the alkaline cleavage of acenaphthenequinone with aqueous potassium hydroxide is well-known and was first reported by Graebe and Gfeller, Ann. 276, p. 1 (1893). According to their procedure, acenaphthenequinone and aqueous potassium hydroxide (30–33%) were heated together by immersing the reaction vessel in an oil bath and gradually increasing the temperature of the bath to 140°–150° C. Though the authors reported "almost" quantitative yields of 1,8-naphthaldehydic acid product, other investigators in further work with this reaction experienced considerable variation in results.

Cason et al., J. Org. Chem. 15, p. 608 (1950) reported that no naphthaldehydic acid was obtained when the procedure of Graebe and Gfeller "was followed rigorously," the chief product being 1,8-naphthalic acid. Under milder conditions, they obtained naphthaldehydic acid, but the separation of naphthalic acid was necessary and the average yield of naphthaldehydic acid was only about 50% even under carefully controlled conditions. For example, in what they reported as their best procedure, the acenaphthenequinone and 30% aqueous potassium hydroxide were heated in a steam-bath with stirring under nitrogen for 12 minutes (time elapsing from placing the cold mixture in the steam-bath until its removal). The reaction mixture was then diluted with water, acidified and the naphthalic acid was precipitated as the insoluble anhydride. After filtering the anhydride precipitate, 1,8-naphthaldehydic acid was crystallized from the filtrate in 53% yield. As discussed by Cason et al., others have reported different yields. For example, Zink, Monatsh., 22, p. 986 (1901) reported an 82% yield of naphthaldehydic acid and the formation of some naphthalic acid, while Fuson et al., J. Amer. Chem. Soc., 71, p. 1870 (1949) reported 68–73% yields of naphthaldehydic acid but did not report the formation or separation of naphthalic acid by-product.

In our studies based on these prior procedures, we obtained a product yield of 75% by immersing the reaction vessel containing the reaction solution in a preheated bath (150° C.—which resulted in an internal temperature of 108° C.) for 12 minutes. However, the purity of the product was found to be less than 70%. Also, prolonged heating was found to reduce the overall yield of naphthaldehydic acid product.

Besides the wide variation in results, the alkaline cleavage of acenaphthenequinone as carried out in the procedures discussed above is not siutable for the production of 1,8-naphthaldehydic acid on a commercial scale. Heating the reaction mixture in large batches at elevated temperature for a brief interval of 10 to 12 minutes is impractical. Moreover, product purity is relatively poor, and the recrystallizations needed to obtain 1,8-naphthaldehydic acid in a reasonably pure form invariably result in some product loss further reducing overall yields.

The present invention is concerned with an improved method of synthesizing 1,8-naphthaldehydic acid wherein the alkaline cleavage reaction is conducted at room temperature.

SUMMARY OF THE INVENTION

It is, therefore, the primary object of the present invention to provide an improved method for the synthesis of 1,8-naphthaldehydic acid.

Other objects of this invention will in part be obvious and will in part appear hereinafter.

The invention accordingly comprises the process involving the several steps and the relation and order of one of more of such steps with respect to each of the others, which are exemplified in the following detailed disclosure, and the scope of the application of which will be indicated in the claims.

DESCRIPTION OF THE PREFERRED EMBODIMENTS

According to the present invention, it has been found that the alkali cleavage of acenaphthenequinone may be carried out at room temperature or thereabouts using a solvent system of a saturated aliphatic sulfoxide or sulfone and water. By conducting the reaction at relatively low temperatures, results are easily repeated and in a preferred embodiment, 1,8-naphthaldehydic acid may be obtained in consistently high overall yields. In addition to eliminating the wide variation in yields encountered in prior processes, the acid product may be obtained in improved purity. Moreover, the process is suitable for use in preparing naphthaldehydic acid on a commercial scale.

The sulfoxide or sulfone employed in the solvent system of the present invention may be a dialkyl sulfoxide or a dialkyl sulfone wherein the alkyl groups contain 1 to 6 carbon atoms or the two alkyl groups may be combined to form a ring having up to 6 members. Illustrative materials include dimethyl sulfoxide, diethyl sulfoxide, dimethyl sulfone and tetramethylene sulfone (sulfolane). The alkali employed may be an aqueous solution of an alkaline earth metal hydroxide, such as, calcium hydroxide or barium hydroxide or preferably an aqueous solution of an alkali metal hydroxide, such as, sodium hydroxide, potassium hydroxide or lithium hydroxide. In a particularly preferred embodiment, the organic solvent is dimethyl sulfoxide (DMSO) and the alkali is an aqueous potassium hydroxide solution.

In carrying out the method of the present invention a suspension of acenaphthenequinone in DMSO may be added to an aqueous solution of potassium hydroxide, but preferably, the aqueous potassium hydroxide solution is added to the suspension of acenaphthenequinone in DMSO. The reaction mixture thus obtained is then stirred at close to room temperature, i.e., between about 20° and 60° C. and preferably between 25° and 50° C. until the reaction is complete which usually ranges between about one and twenty-four hours depending upon temperature and the dilution of the reaction mixture.

A complete solubility of the reactants during the course of the reaction may not be necessary. Successful conditions have been found for carrying the reaction under both homogenous and heterogenous conditions.

Particularly satisfactory results are obtained by employing the potassium hydroxide and DMSO in a ratio of about 0.6 to 1.0 gram of hydroxide per gram of DMSO and employing between about 50 and 400 grams of DMSO per 0.1 mole of acenaphthenequinone. The aqueous solution of potassium hydroxide may contain 30 to 60% hydroxide but preferably, the aqueous solution contains about 40% potassium hydroxide and is added to the acenaphthenequinone suspension in an amount between about 90 and 900 grams to achieve the above hydroxide/DMSO ratio.

After the reaction is complete, the 1,8-naphthaldehydic acid product is isolated in a known manner. For example, the reaction mixture may be diluted with water followed by the addition of hydrochloric or other appropriate acid to adjust the pH to about 6.0 to 7.0. As will be seen from the examples, in a certain range of concentrations of potassium hydroxide and of DMSO, upon completion of the reaction, the solution separates into two phases, the lower of which contains about 90% of the alkali, and none of the product, while the top phase contains most of the DMSO and all the product. The product is therefore isolated by dilution and acidification of the top layer only. The 1,8-naphthaldehydic acid product precipitated upon neutralization is filtered, and where a very pure product is desired, the precipitate after drying may be crystallized from an organic solvent, such as, benzene, ethyl acetate and preferably, xylene.

The reaction scheme comprising the present invention is illustrated below.

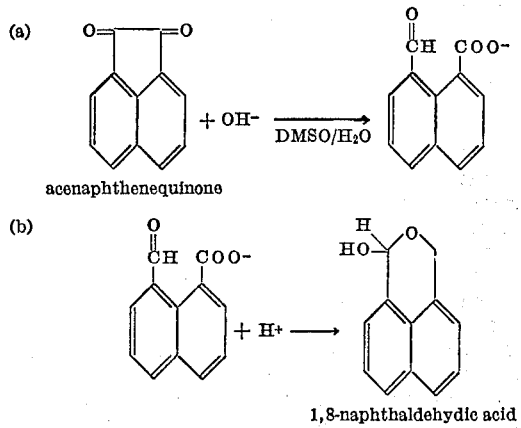

The following examples are given to further illustrate the present invention and are not intended to limit the scope thereof.

EXAMPLE 1

This example illustrates the process as carried out under heterogenous conditions.

To a suspension of 20 g. (0.11 mole) of acenaphthenequinone in 56 g. of dimethyl sulfoxide, 93 g. of 45% aqueous potassium hydroxide was added all at once under vigorous stirring. After stirring at room temperature (about 28° C.) overnight (16–18 hrs.), 350 ml. of ice-water was added, which brought about a homogeneous solution. The solution was filtered and diluted with water to a total volume of 1 l. After neutralizing with conc. hydrochloric acid to pH 6.5–7 (pH ion paper) and stirring for 1 hr., the solid was filtered (with dam) and washed with about 50 ml. of water. The solid was dried at 60° C. in a vacuum oven for 15 hrs. yielding 20.55 g. (93% by wt. yield, 87.5% purity by sodium hydroxide titration) of crude 1,8-naphthaldehydic acid.

One gram of the crude material was crystallized from 30 ml. of xylene; 0.80 g. (80% by wt. yield, purity 98% by sodium hydroxide titration), melting range 167.5–169° C., of the pure naphthaldehydic acid was obtained.

EXAMPLE 2

This example illustrates the process as carried out under homogeneous conditions. This variation is specially desirable when a high purity (and consequently less soluble) acenaphthenequinone is employed.

To a suspension of 20 g. (0.11 mole) of acenaphthenequinone in 196 g. of dimethyl sulfoxide, 325.5 g. of 39% aqueous potassium hydroxide was added all at once under vigorous stirring. After stirring at room temperature (about 24° C.) for 8 hrs., the reaction mixture was poured into a 500 ml. separatory funnel. The clear bottom layer (274 g.) was discarded and the top dark layer was diluted with about 450 ml. of water to a total volume of 700 ml. One gram of celite was added and the solution was filtered. After neutralizing with conc. hydrochloric acid (about 16 ml. was required) to pH 6–7 (pH ion paper) and stirring for 1 hr., the solid was filtered (with dam) and washed with three 100 ml. portions of water. The solid was dried at 60° C. in a vacuum oven for 15 hrs., yielding 17.75 g. (81% by weight), of 1,8-naphthaldehydic acid, melting range 165–166° C., 95% purity.

Five grams of the above material was crystallized from 90 ml. of xylene, yielding 4.85 g. (97% by weight), of 99.8% pure naphthaldehydic acid, melting range 170–171° C.

EXAMPLE 3

Example 1 was repeated except that the acenaphthenequinone (20 g.) was suspended in 258 g. of dimethyl sulfoxide and 558 g. of 42% aqueous potassium hydroxide was added to the suspension. Before crystallization from xylene, 1,8-naphthaldehydic acid was obtained in 84% by weight yield and 99.8% purity.

EXAMPLE 4

Example 3 was repeated except that the reaction temperature was raised from room temperature (~26°) to 50° (reaction time 1 hr.). Before crystallization from xylene, 1,8-naphthaldehydic acid was obtained in 85% by weight yield and 97.8% purity.

As noted above, other solvents may be employed, particularly alkali-stable dipolar aprotic solvents, such as, the aforementioned saturated aliphatic sulfoxides and sulfones. Also, other aqueous alkali may be employed. For example, the procedure of Example 2 was repeated using an equivalent amount of sodium hydroxide for the potassium hydroxide to yield about 26% by weight of 1,8-naphthaldehydic acid. When a dipolar aprotic solvent other than DMSO and a hydroxide other than potassium hydroxide are employed, they are used in the same proportions given above. However, to achieve optimum yields at room temperature or thereabouts, the alkali employed preferably is potassium hydroxide. Particularly satisfactory results are achieved by employing an aqueous solution of about 40% by weight potassium hydroxide and using about 300 grams of this aqueous solution for each 180 grams of dimethyl sulfoxide containing 0.1 mole of acenaphthenequinone. If an aqueous solution containing a greater or lesser percentage of potassium hydroxide is employed, the quantity of solution used should be selected to provide an overall concentration of between about 22 and 30% by weight potassium hydroxide in the reaction mixture.

Since certain changes may be made in the above process without departing from the scope of the invention herein involved, it is intended that all matter contained in the above description shall be interpreted as illustrative and not in a limiting sense.

What is claimed is:

1. In a method of preparing 1,8-naphthaldehydic acid by reacting acenaphthenequinone with aqueous alkali and neutralizing the reaction mixture to yield the naphthaldehydic acid product, the improvement which comprises:

(1) mixing (a) an aqueous solution containing about 30 to 60% by weight of a hydroxide of an alkali metal or an alkaline earth metal with (b) a suspension of 0.1 mole of acenaphthenequinone in about 50 to 400 grams of aprotic solvent selected from a dialkyl sulfoxide or a dialkyl sulfone wherein the alkyl groups contain 1 to 6 carbon atoms or are combined to form a ring having up to 6 carbon atoms and (2) stirring the resulting reaction mixture at a temperature between about 20° to 60° C., said hydroxide being present in a ratio of between about 0.6 and 1.0 gram per gram of aprotic solvent and being present in said reaction mixture in a total concentration of between about 22 and 30% by weight.

2. A method as defined in claim 1 wherein said hydroxide is an alkali metal hydroxide.

3. A method as defined in claim 2 wherein said alkali metal hydroxide is potassium hydroxide.

4. A method as defined in claim 3 wherein said aprotic solvent is a dialkyl sulfoxide.

5. A method as defined in claim 4 wherein said dialkyl sulfoxide is dimethyl sulfoxide.

6. A method as defined in claim 5 wherein said aqueous solution contains about 40% by weight potassium hydroxide.

7. A method as defined in claim 1 wherein said temperature is between about 25° and 50° C.

References Cited

Weeks et al.: JACS, vol. 92 (1969), pp. 3418–21.

HENRY R. JILES, Primary Examiner

M. A. M. CROWDER, Assistant Examiner